Patented Mar. 31, 1936

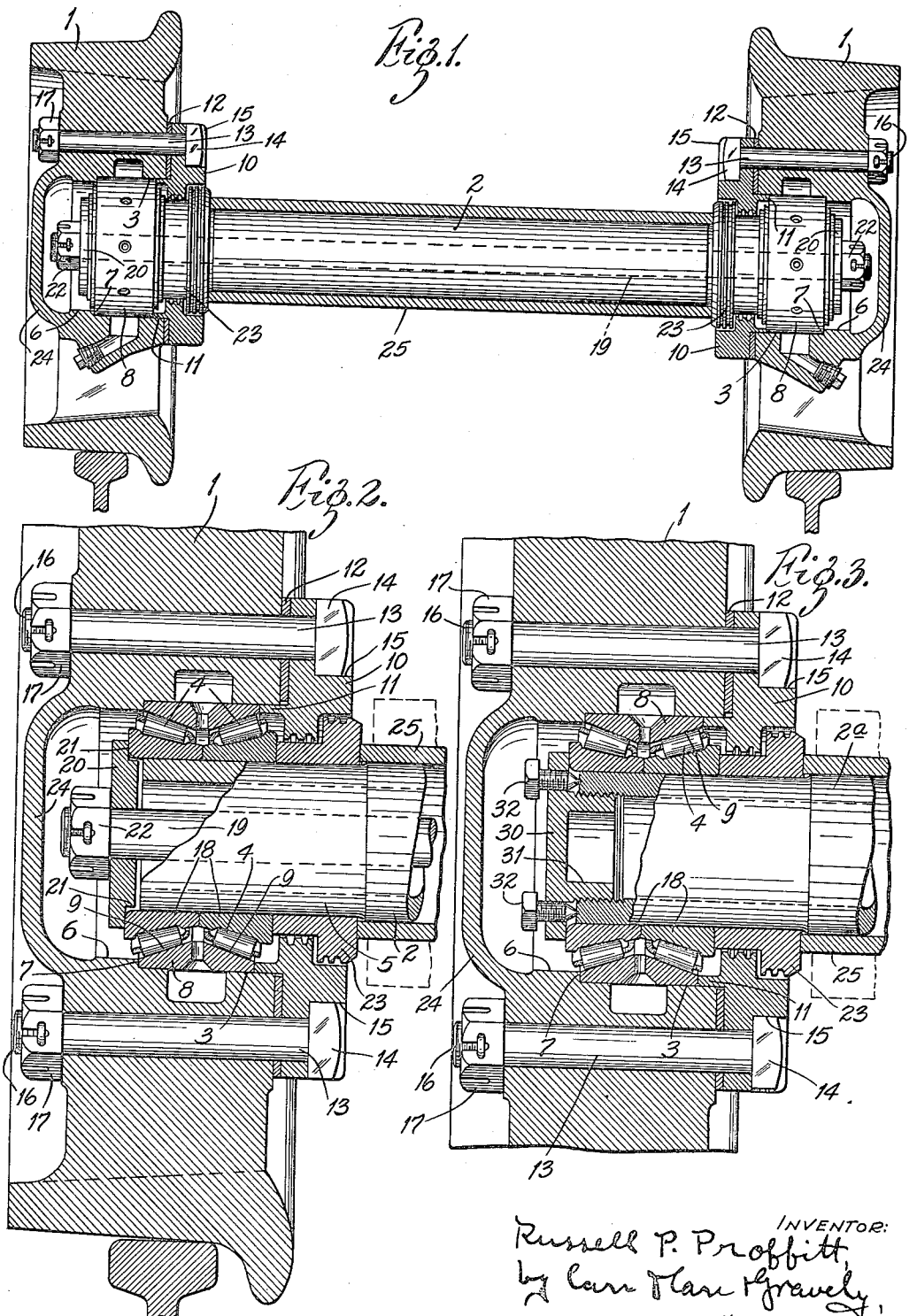

2,035,919

UNITED STATES PATENT OFFICE 2,035,919

ROLLER BEARING CAR WHEEL

Russell P. Proffitt, Chicago, Ill., assignor to The Timken Roller Bearing Company, Canton, Ohio, a corporation of Ohio Application September 27, 1935, Serial No. 42,401

4 Claims. (Cl. 295—36)

My invention relates to car wheel bearings, particularly to taper roller bearings for car wheels of the railway mine car type. The invention has for its principal object to simplify such constructions and reduce their expense and at the same time provide a meritorious and serviceable construction.

The invention consists principally in mounting the bearings of such car wheels on the ends of hollow axles extending into the wheel hub portions with the inner bearing members overhanging the ends of said axle and positioned by means of members mounted at the ends of said axle. The invention further consists in positioning the bearings of the two wheels by means of plates mounted on the ends of a rod that extends entirely through said hollow axle. The invention further consists in the roller bearing car wheel and in the parts and combinations and arrangements of parts hereinafter described and claimed.

In the accompanying drawing,

Fig. 1 is a longitudinal sectional view of a mine car wheel and axle construction embodying my invention, the hollow axle and the bearings being shown in elevation;

Fig. 2 is an enlarged longitudinal sectional view showing one car wheel and one end of the axle; and Fig. 3 is a similar sectional view showing a modification.

Flanged car wheels 1 are rotatably mounted on the ends of a hollow axle 2 that project into the hub bores 3 of said wheels, taper roller bearings 4 being interposed between each wheel bore and the adjacent end portion 5 of the axle.

An inwardly radially extending rib 6 near the outermost end of each wheel bore 3 provides a shoulder 7 against which is seated the end of an outer bearing member or cup 8 that is mounted in the wheel bore. Preferably, said cup 8 is in the form of a doubly coned member whose raceway portions 9 taper toward the middle. A closure ring 10 at the inner face of each wheel 1 has a sleeve portion 11 extending into the wheel bore and abutting against said bearing cup 8, so that it is firmly held between said shoulder 7 and said sleeve portion 11. A spacer washer 12 may be interposed between the face of the wheel and said closure ring 10. Securing bolts 13 have their heads 14 resting in countersunk recesses 15 in said closure ring, which grip said heads and prevent them from rotating. The bolts 13 extend through holes in said ring, said spacer washer and the wheel, the threaded ends 16 thereof projecting beyond the outer face of the wheel. Nuts 17 on said ends of said bolts 13 draw the parts up tight.

The cones 18 or inner bearing members of said member are mounted on the end of the hollow axle 2, with the outermost portion of each outermost cone 18 projecting beyond the end of said axle. As shown in Figs. 1 and 2, a tie rod 19 extends entirely through the hollow axle 2 and centrally perforated positioning plates 20 are mounted on the end portions of said tie rods, said plates having an inwardly facing rabbeted portion 21 extending around their outer periphery and engaging the outermost end of the bearing cone 18. Said positioning plates 20 are held in place by means of nuts 22 on the threaded ends of said tie rod 19.

A closure sleeve 23 mounted on the hollow axle 2 extends through each closure ring 10, the ring and sleeve cooperating to form a closure for the inner end of the hub bore, the outer end being closed by an integral hub cap 24. Said sleeves 23 are spaced apart by means of a tubular casing 25 mounted on the hollow axle 2 and extending from sleeve 23 to sleeve 23.

By this arrangement, the wheels 1, bearings 4 and axle 2 are firmly secured together. The wheels 1 may be removed, leaving the bearings in place on the axle by removing the nuts 17 of said bolts 13 and withdrawing the wheels from the outer bearing members 8.

In the modification shown in Fig. 3, positioning caps 30 engaging the ends of said bearing cones 18 have threaded sleeve portions 31 screwed into threads at the ends of the bore of the hollow axle 2a. Lock screws 32 in said cap bear against the end of the axle.

The above arrangement is of simple construction, yet it is strong and serviceable. The wheels may easily be removed for inspection and repair of bearings. The simple bearing positioning arrangement dispenses with numerous members heretofore required. The tubular axle casing may be ordinary unwelded black iron pipe. By having it extend from spacer sleeve to spacer sleeve, the sleeves may have a light fit on the axle, though they may be mounted rigidly thereon, if desired. Obviously, numerous changes may be made without departing from my invention and I do not wish to be limited to the precise construction shown.

What I claim is:

1. A railway car axle construction comprising a hollow axle, wheels rotatable on the ends of said axle, double row taper roller bearings interposed between each wheel and an end portion of said axle, said bearings each having an inner bearing member projecting beyond the end of the axle, positioning means for said inner bearing members mounted at the ends of said hollow axle, sleeves on said axle abutting against the innermost ends of the respective bearing cones and a casing on said axle extending from sleeve to sleeve.

2. A railway car axle construction comprising a hollow axle, wheels rotatable on the ends of said axle, double row taper roller bearings interposed between each wheel and an end portion of said axle, said bearings each having an inner bearing member projecting beyond the end of the axle, positioning means for said inner bearing members mounted at the end of said hollow axle, said wheels having hub bores with shoulders, the outer bearing members of said bearings being seated in said hub bores with their outermost ends against said shoulders, closure rings seated against the inner faces of the wheels and having sleeve portions projecting into said hub bores into engagement with said outer bearing members, bolts extending through said closure rings and said wheels, the heads of said bolts being seated against said closure rings and their threaded outer ends projecting beyond the outer faces of the wheels and securing nuts on the outer ends of said bolts.

3. A railway car axle construction comprising a hollow axle, wheels rotatable on the ends of said axle, double row taper roller bearings interposed between each of said wheels and said axle, an inner bearing member of each bearing projecting beyond the end of said axle, a rod extending through said axle, positioning members mounted on said rod and engaging the inner bearing members of said roller bearings, a sleeve on said axle engaging the innermost end of each bearing cone, a ring at the end of each wheel surrounding the adjacent sleeve and a tubular casing on said axle extending from sleeve to sleeve.

4. A railway car axle construction comprising a hollow axle, wheels rotatable on the ends of said axle, double row taper roller bearings interposed between each of said wheels and said axle, an inner bearing member of each of said bearings projecting beyond the end of said axle, a rod extending through said axle and plates mounted on said rod with rabbeted peripheral portions engaging the inner bearing members of said roller bearings.

RUSSELL P. PROFFITT.